137-13.
OR 3,570,509
SR

United States Patent [11] 3,570,509

| [72] | Inventors | Hans-Dieter Kinner |
| | | Attleboro; |
| | | Richard W. Hatch, Foxboro; Paul M. |
| | | Blaiklock, Newton Centre, Mass. |
| [21] | Appl. No. | 720,708 |
| [22] | Filed | Apr. 11, 1968 |
| [45] | Patented | Mar. 16, 1971 |
| [73] | Assignee | The Foxboro Company |
| | | Foxboro, Mass. |

[54] METHOD AND APPARATUS FOR PRODUCING A FIXED FREQUENCY FLUID SIGNAL
6 Claims, 4 Drawing Figs.

[52] U.S. Cl. ........................................ 137/13, 137/81.5
[51] Int. Cl. ........................................ F15c 3/08, F15c 3/14
[50] Field of Search ........................................ 137/81.5, 1, 13

[56] References Cited
UNITED STATES PATENTS
3,228,602  1/1966  Boothe ........................ 137/81.5X

| 3,292,648 | 12/1966 | Colston .................. | 137/81.5X |
| 3,395,719 | 7/1968 | Boothe et al. .................. | 137/81.5X |
| 3,412,745 | 11/1968 | Kelley .................. | 137/81.5 |
| 3,454,025 | 7/1969 | Egli .................. | 137/81.5 |

FOREIGN PATENTS
| 1,010,930 | 11/1965 | Great Britain .................. | 137/81.5 |
| 1,044,117 | 9/1966 | Great Britain .................. | 137/81.5 |

Primary Examiner—William R. Cline
Attorney—David E. Hoppe

ABSTRACT: A pair of elements each incorporate vibrating reed means for producing an oscillatory output at a predetermined frequency; the oscillatory output from the two elements are effectively beat together by a fluidic amplifier to thereby produce a resultant signal having an envelope whose frequency is the difference between the respective frequencies produced by the two oscillatory elements; a signal corresponding to this envelope may be obtained from the fluidic amplifier output by suitable filtering to thereby produce a square wave having a stable interval; this square wave output may be employed for timing and clock functions in fluidic systems.

Patented March 16, 1971 3,570,509

INVENTOR.
HANS-DIETER KINNER, RICHARD W. HATCH JR.
PAUL M. BLAIKLOCK
BY David E. Hoffee
ATTORNEY Patented March 16, 1971

INVENTOR.
HANS-DIETER KINNER, RICHARD W. HATCH JR.
PAUL M. BLAIKLOCK
BY
David E. Hopper
ATTORNEY

METHOD AND APPARATUS FOR PRODUCING A FIXED FREQUENCY FLUID SIGNAL

In fluidic systems such a fluidic programmers, some means is generally required for determining the timing functions throughout the system. As a basic component of a timing system, some form of timing signal having a regular and fixed interval is required. To match the response rate of a typical fluidic system, the basic timing signal should conveniently have an acceptably low frequency. Preferred fluidic frequencies are usually in a range well under 500 c.p.s. such that conventional means to obtain them would ordinarily require relatively large mechanical components. The present invention provides a low frequency, constant-interval timing signal generated using a small size of fluidic components such as are generally employed for fluidic functions, thereby providing for a timing device occupying a minimum amount of space.

It is therefore an object of this invention to provide a compact fluidic-timer generating a fixed frequency output signal having a low repetition rate and a stable fixed interval. It is also an object of this device to provide for the generation of a fluidic or air timing signal suitable for originating timing functions generally in fluidic systems.

Other objects and advantages of this invention will be apparent from the description herewith and in part from the accompanying drawings, wherein.

Figure 1:
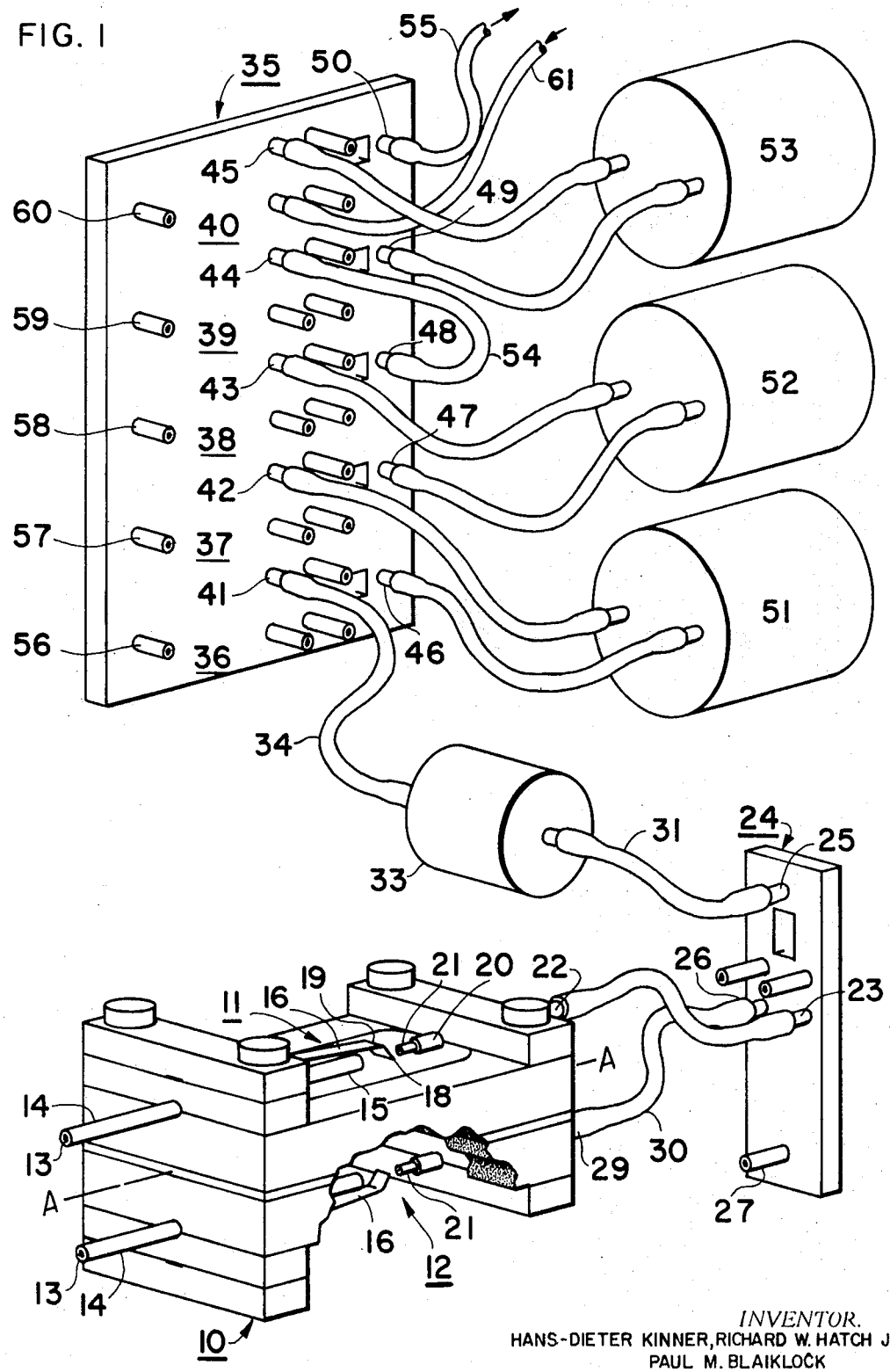
FIG. 1 is a three-dimensional diagrammatic view of the fluidic timer together with mixing and filtering systems.
Figure 2:
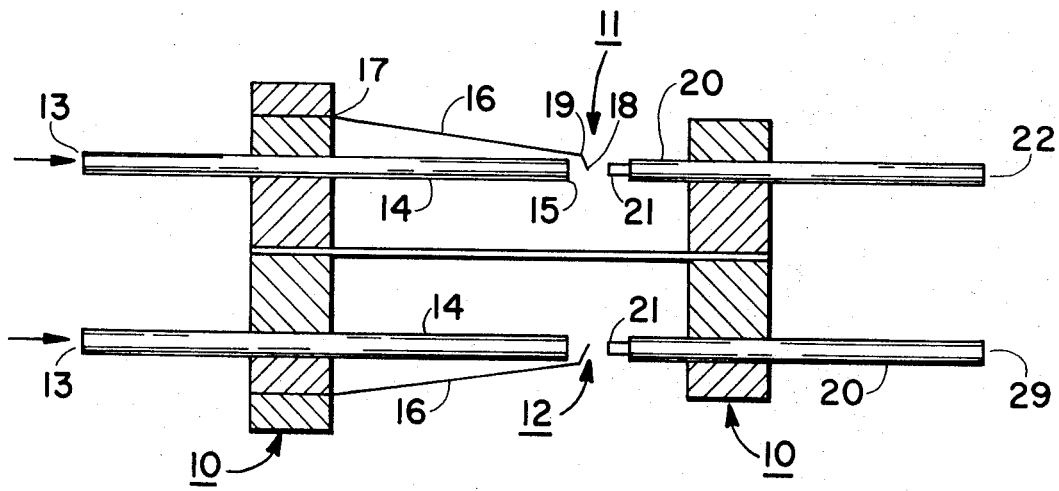
FIG. 2 is a cross-sectional view of the basic timer.

Referring to FIG. 1, and more particularly to FIG. 2 showing a cross section of mounting assembly 10 taken along A-A, mounting assembly 10 carries fluidic oscillators 11 and 12, each adapted to oscillate at a predetermined frequency such that the frequency difference thereof is the desired timing frequency. Describing fluidic oscillator 11, for convenience, air supply source 9, illustratively at 10 inches of water pressure, is coupled to inlet 13 of supply tube 14 of fluidic oscillator 11. The air is projected from outlet 15 of supply tube 14 at a velocity adapted for the function of fluidic oscillator 11. Flexible elastic member 15, which may be made of spring steel, has one end 17 fixedly mounted to mounting assembly 10, and the other end 18 partially protruding into the projected air stream from outlet is of supply tube 14. For obtaining desirable characteristics of fluidic oscillator 11 action, a bend 19 is made in flexible member 16 so that end 18 intercepts the projected stream from the supply tube 14 at a relatively sharp angle. Receiver 20 has its inlet end 21 positioned to sense the impact of the stream projected from end 15 of supply tube 14. The interaction between end 18 of flexible member 16 and the projected air stream from supply tube 14 is such that a vibrating action takes place in member 16 as a whole; end 18 vibrates in the projected air stream from supply tube 14 thereby periodically modulating the air stream. Consequently the impact made at end 21 of receiver tube 20 is regularly fluctuating in accordance with the vibration of member 16. The frequency of the sensed impact by receiver tube 20 will be determined by many factors, including the velocity of the projected stream from end 15 of supply tube 14, the spring rate of member 16, and the positioning and angle of end 18 with respect to the projected air stream. The output of fluidic oscillator 11 is taken from end 22 of the supply tube 20 and coupled through conduit 28 to one control input 23 of fluidic amplifier 24 which performs a mixing function. Fluidic amplifier 24 may be any suitable fluidic amplifier having a plurality of inputs such that any one of the inputs may operate to regulate output 25 of amplifier 24. Such an amplifier is disclosed in U.S. Pat. Application No, 662,273 filed Aug. 18, 1967, now abandoned. This application has been abandoned in favor of continuation-in-part U.S. Pat. application No. 741,018, filed Jun. 28, 1968.

Figure 4:
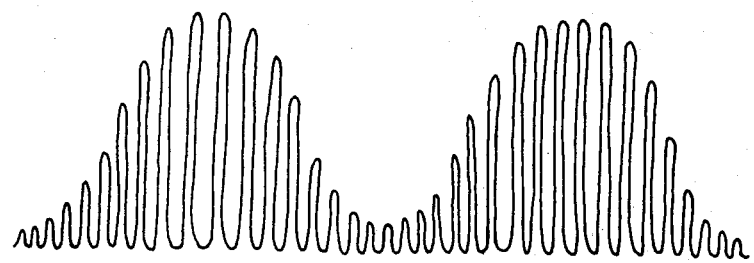
FIG. 4 is a diagram of the mixing amplifier output waveform.

Fluidic oscillator 12 operates in the same manner as oscillator 11, and it components are like numbered for convenience. In the case of fluidic oscillator 12, it is designed to operate at a slightly different oscillator frequency than element 11. For example, oscillator 11 may operate at 69 c.p.s., and oscillator 12 at 71 c.p.s., The oscillatory output of element 12 is taken from output 29 and coupled through conduit 30 to input 26 of amplifier 24. Amplifier 24 is supplied with air pressure at supply input 27, and produces an output 25 which is effectively the beat resultant of the two differing frequencies supplied to inputs 23 and 26. When either of the input signals connected to 23 and 26 are present, the output signal at 25 is reduced; when the input signals are both absent, output 25 is on. FIG. 4 represents the resultant signal appearing at output 25 of amplifier 24.

Figure 3:
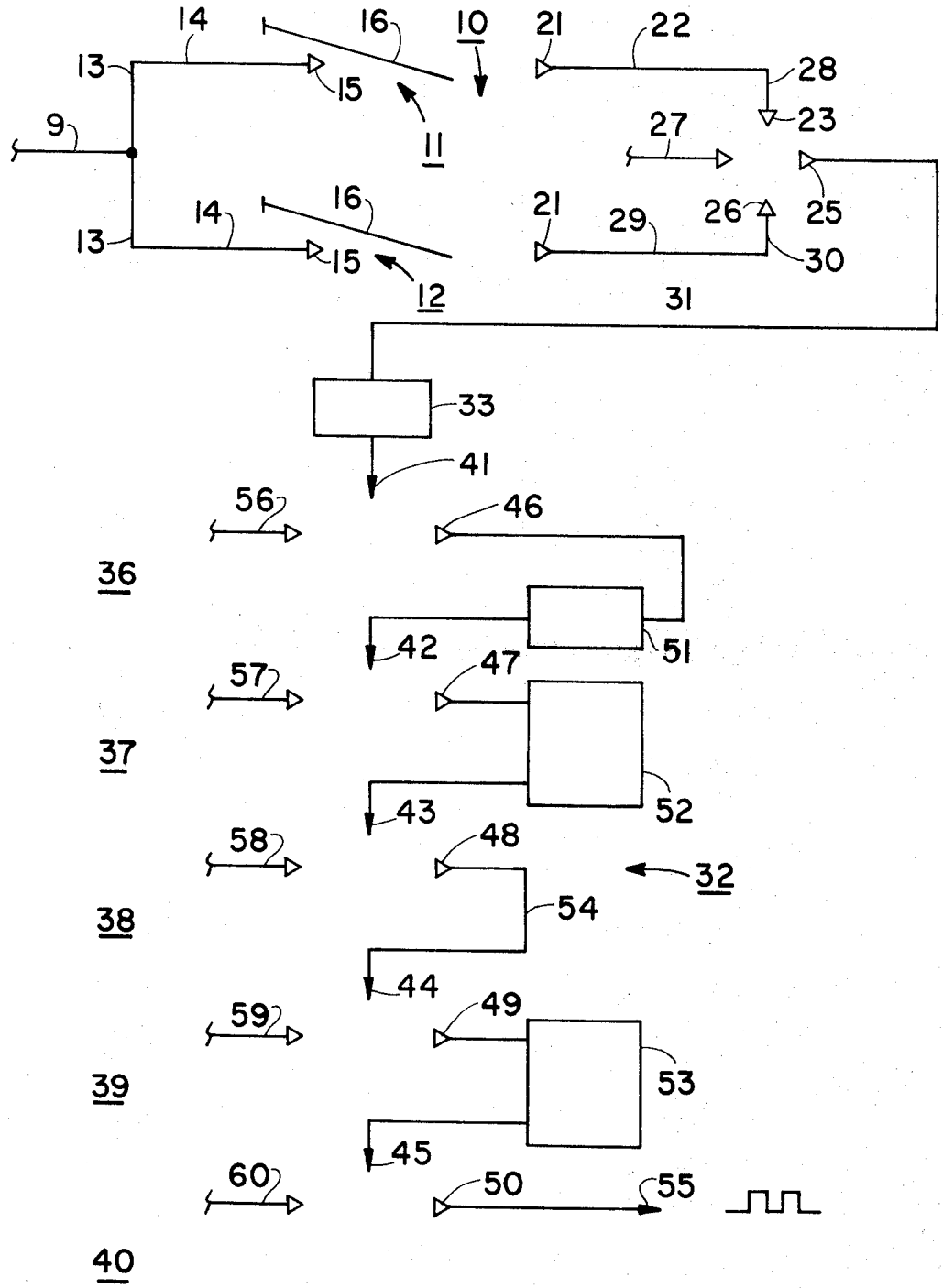
FIG. 3 is a schematic diagram showing the functional interrelationships of the components of the system.

The signal at output 25 is coupled through conduit 31 into fluidic capacitive element 33, being the input element of a filtering system generally indicated at 32. The function of filtering system 32 is to remove the individual frequency components generated by fluidic element oscillators 11 and 12 respectively, and to produce as an output a wave representing the different frequency only. Conduit 34 connects the output of tank 33 to a filtering system conveniently embodied in an etched plate 35, containing fluidic amplifiers 36, 37, 38, 39 and 40. These amplifiers may be such as described in U.S. Pat. No. application 662,273 filed Aug. 18, 1967. Conduit 34 is connected to control input 41 of amplifier 36, and output 46 of amplifier 36 is connected to capacitive element 51, which provides further filtering. The output of capacitive element 51 is coupled to input 42 of the next succeeding amplifier 37, and its output 47 is in turn coupled to capacitive element 52, providing further filtering. The output of capacitive element 52 is coupled to the input 43 of amplifier 38, whose output 48 is directly coupled through conduit 54 to input 44 of amplifier 39, to provide an increased amplification. Output 49 of amplifier 39 is coupled to capacitive element 53 whose output is connected to input 45 of amplifier 40 having an output 50 providing the effectively demodulated difference frequency at output 55. Output 55 represents the output timing signal. The filtering section effectively acts as a conventional resistance-capacitor filter to remove the high frequency components of a signal, thereby providing an output which is effectively an envelope of the original mixture of signals. FIG. 3 shows a functional schematic of the entire system, including timer, mixing amplifier, and filter.

As many embodiments may be made of the above invention, and as changes may be made in the embodiments set forth above without departing from the scope of the invention, it is to be understood that all matter hereinbefore set forth or shown in the accompanying drawing is to be interpreted as illustrative only and not in a limiting sense.

We claim:

1. Timing apparatus for producing a signal having a fixed frequency comprising:

a pair of vibratory members each having a portion thereof disposed in a respective fluidic stream intermediate a respective fluid supply and a respective fluid receiver in a manner adapted to modulate said fluidic streams by their respectively vibratory actions and wherein each said vibratory member derives its activation from the flow of the said respective fluidic stream with which it is associated; and sensing means responsive to said fluid receivers for sensing the effects of said vibratory members upon said fluidic streams, and mixing means responsive to said sensing means for combining the respective effects of said pair of vibratory members to produce an output signal having a first condition when both vibratory elements effects upon said fluidic streams are simultaneously minimal and having other conditions according to the modulation by said vibratory members of said fluidic streams whereby said output signal has a beat frequency containing a frequency component corresponding to the difference between the frequencies of said vibratory members.

2. The timing apparatus of claim 1 wherein each said vibratory member vibrates at a slightly different frequency from one another thereby modulating respective air streams at different frequencies, with the modulated air streams being coupled to respective inputs of a fluidic mixer in which a maximum signal output is produced when both said inputs are minimal and said output is reduced according to the effects of both fluidic streams at said inputs whereby said output is a beat frequency type of signal.

3. The timing apparatus of claim 1 in combination with a capacitive type filter network for filtering the output of said mixing means to reduce the high-frequency components therein to thereby produce a resultant timing signal having a frequency corresponding to the difference frequency between the frequencies of said pair of vibrating members.

4. The timing apparatus of claim 3 wherein said resultant timing signal is of a very low frequency.

5. The timing apparatus of claim 1 wherein each said vibratory member is fixedly mounted by one portion thereof and has another portion at least partially disposed in its respective said fluidic stream.

6. A method for producing a fluidic timing signal comprising the steps of modulating a pair of fluidic streams by means of respective vibratory elements with each vibratory element deriving its actuation from the flow of its respective said fluidic stream, mixing the modulated fluidic streams to produce a beat frequency signal including a frequency component corresponding to the difference in frequencies between said modulated streams, and filtering said beat frequency signal to thereby produce a resultant timing signal having a frequency corresponding to the difference between the frequencies of said modulated streams.